Figure 1:
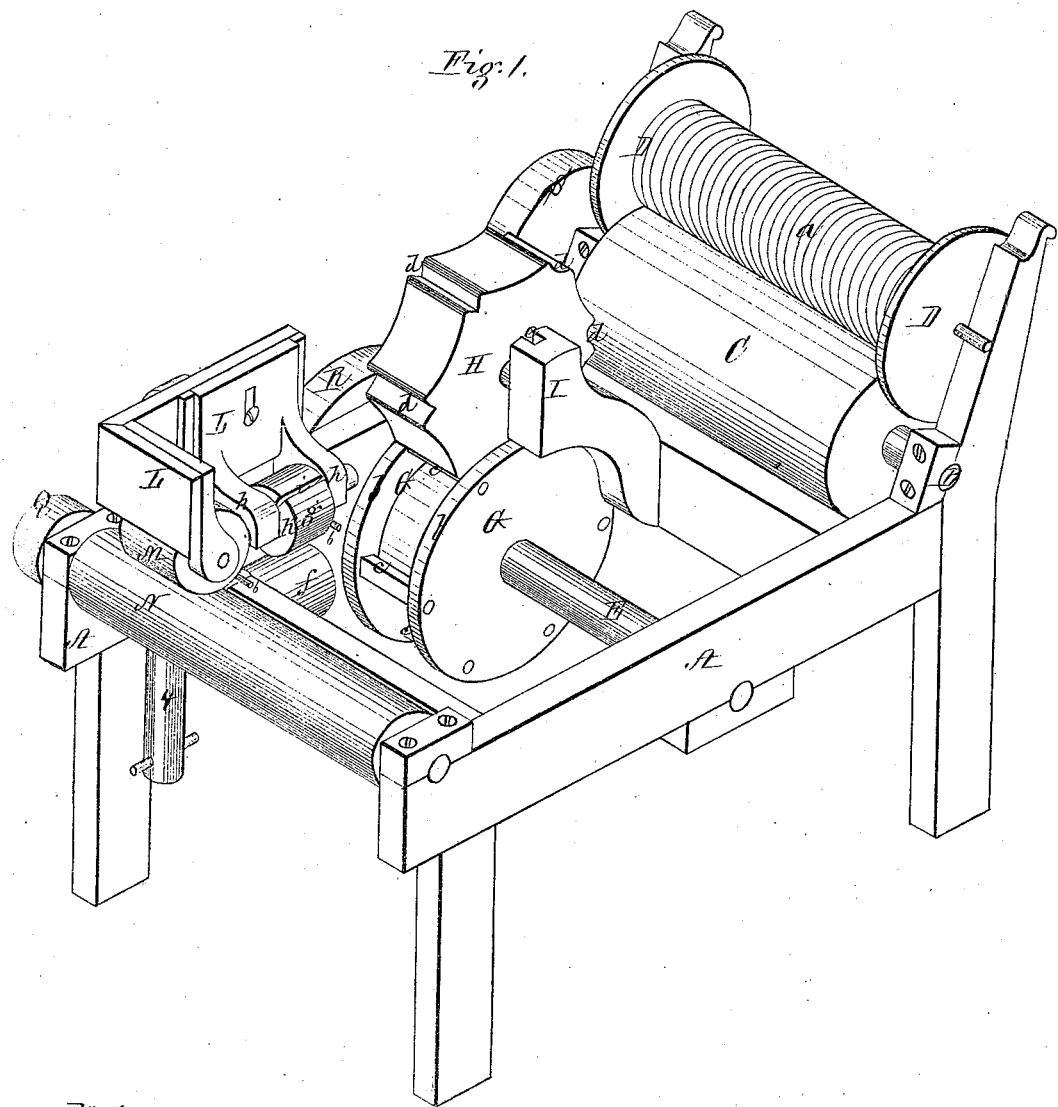
Figure 2:
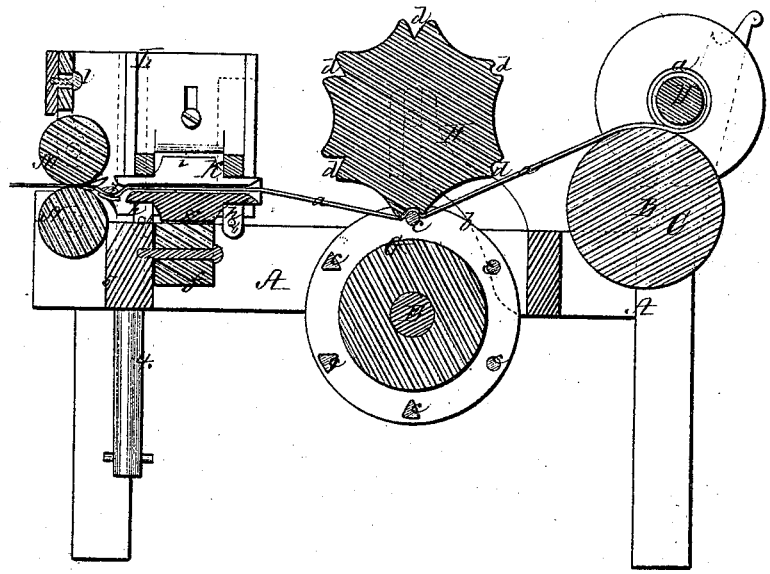
Figure 3:
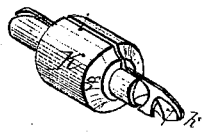

L. W. Felt,
Spinning Mach.
No. 103,858. Patented June 7, 1870.

Witnesses,
Ephraim Foster
William Brown

Inventor,
Leuther W. Felt

*L. W. Felt,*
*Spinning Mach.*

No. 103,858. Patented June 7, 1870.

Witnesses,
Ephraim Foster
William Brown

Inventor,
Lewther W. Felt